United States Patent [19]
Dörfel et al.

[11] 3,854,646
[45] Dec. 17, 1974

[54] PRESSURE-BALANCED WIDE WEB GUIDE ROLLER

[75] Inventors: Walter Dörfel; Bernd Görner, both of Weilheim-Teck, Germany

[73] Assignee: Ahlstrom Development GmbH, Weilheim-Teck, Germany

[22] Filed: July 10, 1973

[21] Appl. No.: 377,921

[52] U.S. Cl. ............... 226/191, 226/194, 184/6.26, 29/113 AD, 29/116 AD
[51] Int. Cl. ........................................... B65h 17/20
[58] Field of Search ................... 226/194, 191, 190; 29/113 R; 113 AD, 130, 116 AD; 184/6.26

[56] References Cited
UNITED STATES PATENTS

| | | |
|---|---|---|
| 2,689,392 | 9/1954 | Robertson ..................... 29/113 AD |
| 3,050,829 | 8/1962 | Appenzeller .................. 29/113 AD |
| 3,225,418 | 12/1965 | Fara ............................... 29/113 AD |
| 3,389,450 | 6/1968 | Robertson ..................... 29/116 AD |
| 3,618,190 | 11/1971 | Vernazza et al. ............. 29/116 AD |
| 3,638,292 | 2/1972 | Gaghan ......................... 29/116 AD |

*Primary Examiner*—Allen N. Knowles
*Attorney, Agent, or Firm*—Joseph A. Geiger

[57] ABSTRACT

A pressure-balanced guide roller assembly adapted for the conveyance of wide webs, where a plurality of roller segments are adjustably arranged on a stationary head traverse and separately biased against the contact pressure of the web. The bearing units of the roller segments are guided in their adjustment motions, and the biasing of all segments is equalized by means of a common pressure chamber on which the roller segments are supported.

32 Claims, 19 Drawing Figures

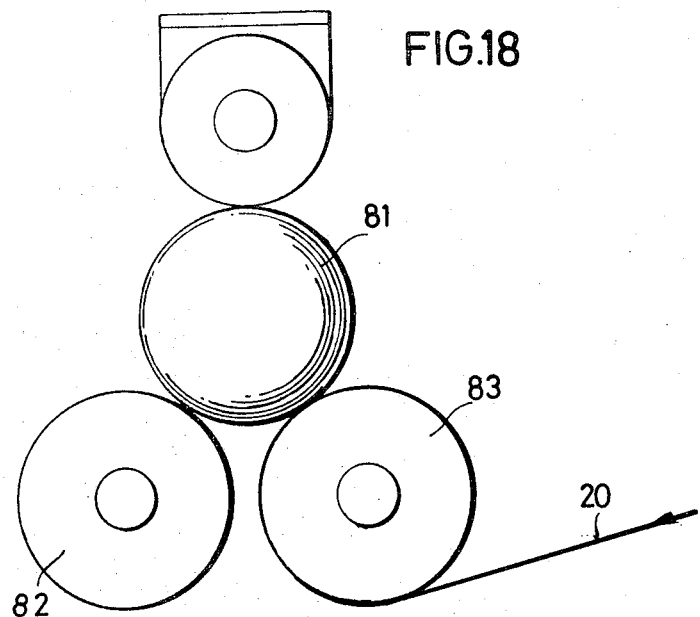
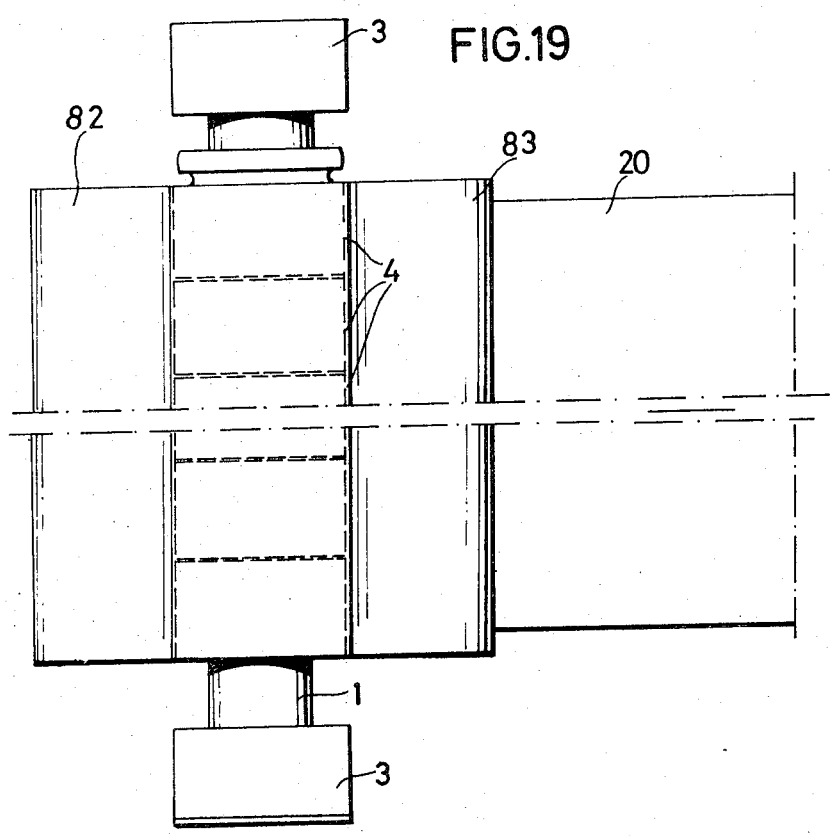

PRESSURE-BALANCED WIDE WEB GUIDE ROLLER

BACKGROUND OF THE INVENTION

1. Field of the Invention

The present invention relates to wide web guide rollers, and in particular to pressure-balanced wide web guide rollers which have a number of adjacent roller segments arranged adjacently on a common head traverse, each roller segment being radially adjustable relative to the stationary head traverse and subjected to a uniform bias against the bearing pressure, so that the roller segments form a common guide surface on which the contact pressure is balanced over all the roller segments, regardless of the operational deflection or intentionally designed curvature of the head traverse.

2. Description of the Prior Art

Guide rollers for very wide webs such as paper webs in paper making machinery are subject to operational problems, when the web tension causes a deflection of the roller axis, which may lead to distortions and folds in the web. Short of increasing the roller diameter to very awkward dimensions, it is therefore necessary to provide this kind of guide roller in the form of multiple roller segments which are individually journaled on a stationary head traverse. Now, if the head traverse includes radial adjustability and biasing means for each roller segment, small deflections in the roller axis can be compensated for by radially shifting some of the roller segments. A small gap between the individual roller segments allows for the angular distortion which results from such deflections.

Since this type of multiple-segment guide roller is adapted to compensate for deflections in the roller axis, it is also possible to intentionally provide a curved roller axis, whereby the roller segments cooperate to serve as a broad-stretching device for a wide web which runs over the guide roller at a small angle of deflection. Obviously, in this special application the direction of roller curvature is not in the sense of roller load, but in the sense of web advance.

The Canadian Pat. No. 814,172 discloses a wide web guide roller of the above-mentioned kind which includes a number of individually journalled roller segments supported by ball bearings or roller bearings, the inner races of the bearings being supported on the head traverse by means of four pressure cushions. These cushions are regularly spaced around the head traverse, and the bearings are otherwise freely movable on the pressure cushions.

This prior art solution was found to create problems under high-speed operation and/or elevated contact pressures, because the support of the inner bearing races on their elastic cushions is unsteady, the cushions yielding in all directions. This can lead to undesirable axial displacements between adjacent bearing elements, and it can also create dangerous radial vibrations of the roller segments.

SUMMARY OF THE INVENTION

It is therefore a primary objective of the pressure invention to provide a wide web guide roller in which the above-mentioned short-comings aree eliminated, and which serves as a stable guide at high operational speeds and high contact pressures, in spite of the radial adjustability and pressure-balancing feature of the individual roller segments.

The present invention proposes to attain the above objective by suggesting adjustability-restricting guide means between the head traverse and the bearing units for the individual roller segments, in combination with a balancing radial bias applied to each roller segment by means of a fluid pressure medium. This arrangement thus permits controlled radial adjustment displacements on each roller segment to achieve a balanced contact pressure against the web, while the bearing units are guided in relation to the head traverse during the adjustment motion.

This novel guide arrangement, though permitting independent yielding of each individual roller segment in the direction of contact pressure on the roller to obtain a balanced overall contact pressure, restricts the mobility of the roller segments in other directions to avoid undesirable vibrations and alignment distortions. Thus, the degree of freedom of roller segment motion is limited to the intended radial adjustability relative to the head traverse. This restriction to a single degree of freedom is particularly important in the case of high-speed operation, where it is necessary to have a stable, vibration-free guide assembly.

In one of the preferred embodiments of the invention each roller segment is supported by a bearing unit, which in turn is supported on the head traverse by means of a pivot connection whose axis is parallel to, but laterally outside the head traverse.

The radial adjustability of each roller segment is thus confined to a pivoting motion in a plane which is perpendicular to the guide roller axis, whereby this pivoting motion approximates a purely radial motion in the mid-area of contact between the web and the guide roller segment. This pivoting motion is responsive to the web contact pressure on the one hand and to a pressurized fluid cushion on the other hand, the equilibrium between the two opposing forces determining the pivoting adjustment position of the bearing unit relative to the head traverse. The pivot support for the bearing unit is preferably so arranged that the stationary part of the pivot support is mounted on the outside of the head traverse, while the movable part of the pivot support is directly attached to a sleeve which carries the inner race of an anti-friction bearing supporting the roller segment.

The aforementioned embodiment in which the bearing unit is pivotably supported against the head traverse is of simple design and inexpensive to manufacture. It is also very effective in restricting the movement of the bearing unit to a single degree of freedom. Experiments have shown that this type of design offers vibration-free operation with multiple roller segments which are supported on a fluid-filled pressure cushion. The pressure cushion itself may be replaced by an arrangement in which the cavity of the head traverse itself is filled with fluid, while the pivotable bearing units include stems which are engaged by membrane-type elements responding to the fluid pressure.

In another preferred embodiment of the invention the bearing units are guided along a straight line in relation to the head traverse, the roller segments thus executing a purely radial reciprocating adjustment motion relative to the head traverse.

Under certain design requirements and operating conditions it may be necessary to restrict the adjustability of the roller segments to this purely radial motion, although the latter embodiment is more complicated in design and assembly than the previously described pivot arrangement.

A preferred form of this straight-line guide includes radially oriented plungers which extend inwardly from the bearing units into the head traverse, where they are guided in bushings mounted to the wall of the head traverse. The inner end of each plunger is exposed to the pressure medium, so that the plungers position the bearing units and roller segments radially at such a distance from the head traverse that an equilibrium exists between the sum of the radially outwardly directed forces on all the plungers - which are identical - and the total radially inwardly directed pressure on the guide roller resulting from the web tension.

The aforementioned guide plungers must form a seal in relation to the inside of the head traverse. This purpose can be fulfilled by either providing a membrane connection between the plunger ends and the guide sleeves, or by arranging a piston head on the end of each guide plunger.

An alternative version of guiding the bearing units radially along a straight line suggests guide elements on opposite sides of the head traverse which take the form of guide rails along which the cooperating guid elements of the bearings units are displaceable. It should be understood that the guide rails may be attached either to the stationary head traverse or to the adjustable bearing unit, the displaceable guide elements being in each case attached to the other member. The guide elements themselves may be in the form of rollers which engage the guide rails, or they may be sliding guide blocks, or lastly, they may be matching guide profiles which engage the guide rails either directly or by means of anti-friction bearing elements such as needles or balls. A very simple and convenient way of imparting the balancing pressure to the bearing units of the roller segments can be obtained by mounting on each bearing unit as least one radially inwardly oriented pestle-shaped headed stem in alignment with the intended adjustment motion of the bearing unit, the head portion of this stem resting against a pressure cushion of the type which is known from Canadian Pat. No. 184,172.

In the case of the pivotably adjustable bearing unit the stem orientation is such that it reaches radially into the head traverse and its head portion bears against the pressure cushion in the vicinity of the plane defined by the pivot axis and the midpoint of the contact area on the pressure cushion. The pressure cushion is preferably a closed, hose-like body which is filled with a pressure fluid. The latter may be a compressible gas, or a non-compressible liquid. The flexibility of the pressure cushion and the uniformity of pressure inside the latter assures that the forces exerted against all the headed stems are identical so that the bearing units and roller segments are automatically adjusted toward or away from the web, until the web contact pressure is equalized over all roller segments.

In the case of several interconnected pressure cushions and unequal overall loads on the pressure cushions, pressure fluid may flow from one cushion to the other so as to again equalize the fluid pressure. Thus, the same result is obtained as with a single pressure cushion.

A single pressure cushion extending through the entire cavity of the head traverse has the advantages of simplicity and ease of assembly and inspection. It is particularly advantageous in connection with the pivotable connection of the bearing units on the head traverse, in which case the head portions of the stems perform a slight rocking motion inside the depression which they form on the surface of the pressure cushion as a result of their inwardly directed force. The flexible pressure cushion is ideally suited to accommodate this rocking motion.

The separate bearing units thus rest against a common pressure cushion with their stems which, like so many legs, support the individual roller segments against the contact pressure of the web. Since all the headed stems have identical heads and, therefore, essentially identical effective contact areas with the pressure cushion, adjustment for equal contact pressures on all roller segments is automatic and continuous.

Where the earlier-mentioned straight line adjustment motion is desired on the bearing units, the headed stem is simply so arranged that it becomes a guide plunger engaging appropriately mounted guide bushings in the wall of the head traeverse.

In the place of the flexible pressure cushion it is also possible to use the cavity of the head traverse itself to serve as a pressure chamber, special elastic members being provided inside this rigid chamber to transmit the biasing forces to the bearing units. These elastic members are in the form of membranes or bellows which are engaged on one side by a stem similar to the earlier-mentioned headed stem, and on the other side by the pressure medium itself.

The elastic members of this type of embodiment are preferably so arranged that their contact points with the stems of the bearing units coincide approximately with the center of the head traverse. In the case of a membrane-type elastic member, the stem is surrounded by a tubular housing which reaches into the head traverse so as to position the membrane near the axis of the former. The housing and membrane may alternatively be replaced by a bellows type member which is attached to the wall of the head traverse and reaches from there into the center portion of the head traverse.

It is, of course, possible to arrange the pressure chamber outside the cavity of the head traverse in the space between the latter and the inner periphery of the bearing unit sleeve, in which case the pivot center would no longer be at mid-height of the head traverse, and the contact area between the pressure cushion or elastic member on the rigid pressure chamber might be outside the head traverse. However, it is clearly more advantageous to arrange the pressure cushion or rigid pressure chamber inside the head traverse and to provide radial openings through which the stems of the bearing units extend inside the cavity of the head traverse to cooperate with the pressure chamber. In this case the cross section of the head traverse can be provided with a maximum of bending stiffness within the limits determined by the inner diameter of the bearing unit sleeve, so as to minimize any deflections of the head traverse under operating loads.

The head traverse is, therefore, preferably of tubular cross section, either round or square. The flexible pressure cushion can then be conveniently accommodated inside the head traverse itself and preferably extends through the entire length of the latter. This arrangement permits the insertion and removal of a flexible pressure cushion without the prior removal of all the bearing units from the head traverse.

As mentioned earlier, the tubular head traverse may itself form a rigid pressure chamber, in which case the openings through which the connecting stems of the bearing units penetrate into the pressure chamber are surrounded by elastic members, such as membranes or bellows.

In spite of the foregoing preference for an arrangement of the pressure cushion or pressure chamber inside the head traverse, it should be understood that the present invention is not limited to such arrangements. Thus, the present invention also includes as an alternative embodiment, a suggestion in which one or two narrow flexible pressure cushions are arranged between the outer diameter of the head traverse and the inner diameter of the bearing unit, the guide means for the bearing units being provided in the form of guide collars which are fixedly mounted on the head traverse in the space straddling the gap between adjacent roller segments. These guide collars are so arranged that every two of them accurately position and guide between them a bearing unit sleeve so as to give it the desired limited degree of freedom for radial adjustment motion.

The direct support of each bearing unit on its inner diameter against the thin, arcuate pressure cushion provides a large contact surface and thus stabilizes the adjustment motion in combination with the rigid guide collars which also have lateral guide faces cooperating with the bearing units on all sides of the head traverse. In a preferred version of this embodiment the bearing units are anti-friction bearings mounted on simple sleeves which longitudinally alternate on the head traverse with cooperating guide collars, thereby providing an extremely simple assembly operation. This arrangement makes it possible to use commercially available standardized anti-friction bearings for the roller segments, without the need of modifying the inner races of the bearings. The large contact area between the sleeve-type bearing unit and the arcuate pressure cushion also offers an excellent alignment of each roller segment in the plane perpendicular to the roller axis.

The guide faces with which the guide collars engage the cooperating bearing unit sleeves are preferably in the form of laterally extending teeth which engage matching teeth of the adjacent part, the flanks of the cooperating teeth permitting a limited amount of radial displacement of the bearing unit and roller segment.

The arrangement of two thin, arcuate pressure cushions on opposite sides of the head traverse also has the advantage of permitting adjustability of the bearing units and roller segments in more than one radial direction within a given plane without loss of stability in other directions. Thus, the guide teeth between the bearing unit sleeves and the guide collars may be arranged to permit two degrees of adjustment freedom of the roller segments. The bearing units and roller segments may thus be permitted to execute radial adjustment motions in different directions within the clearance limits provided by the teeth of their sleeves and of the adjacent guide collars.

This preferred arrangement further provides the possibility of using arcuate pressure cushions which extend over the entire length of the head traverse, by arranging appropriate arcuate recesses inside the guide collars through which the thin pressure cushions extend from sleeve to sleeve of the bearing units. This arrangement is possible when two arcuate pressure cushions of less than 180° are used and each guide collar has two hub portions between the guide cushions on which it is centered against the head traverse. This arrangement has the additional advantage that the continuous arcuate pressure cushion is confined over its entire length by the alternating bearing unit sleeves and guide collars. The guide collars are fixedly attached to the head traverse by means of conventional fasteners such as set screws, for example.

Under normal operating conditions, when a continuous web or a counter roller runs against the guide roller of the invention, there exists an equilibrium condition between the total contact pressure of the web or counter roller, including the weight of the invididual roller segments and the sum of all the biasing forces provided through the pressure cushion or pressure chamber arrangement on the bearing units of the roller segments. However, the operating configuration may be such that the continuous web or counter roller is narrower than the overall length of the pressure-balanced guide roller of the invention, so that one or more roller segments positioned at the extremities of the guide roller are not subjected to any outside load. Yet, these rollers are biased by the adjustment forces from the inside of the head traverse, since they are in contact with the pressure cushion or pressure chamber via their bearing units and actuating elements such as headed stems or plungers, etc.

The invention, therefore, further suggests means which prevent an excessive adjustment displacement on those free end roller segments relative to the head traverse. For this purpose, the guide roller assembly includes in the area of these end roller segments compensation chambers which are under the influence of the pressure medium and with oppose the adjustment motion of the roller segment. The effect of such an arrangement is essentially to maintain the free end roller segment in an adjustment position which corresponds to the average adjustment position of those roller segments which are subjected to the web or counter roller pressure.

It was further found to be preferably to provide a continuous supply of lubricant to the bearing units through appropriately arranged supply conduits. One possibility of providing such a supply is to arrange the supply line to run alongside the stationary head traverse and to include an upstanding, pivotable branch line fo each bearing unit through which lubricant is supplied to the anti-friction bearing. During assembly, the upstanding branch lines of the lubrication system can be pivoted out of position to permit the emplacement of the bearing unit past the branch line, whereupon the latter can be repositioned into its radial orientation.

It is particularly important that each roller segment has a minimal rotational resistance, particularly in the case where light webs of moderate tension pass over the guide roller at a small angular deflection. For such cases, it is particularly advantageous to employ a so-called oil mist lubrication system which requires a smaller amount of lubricant than other systems and which supplies lubricant in even amounts to the anti-friction bearings, especially when the latter operate at high speeds. Oil mist lubrication generally also gives a lower resistance than a lubrication using grease, because the latter has a higher coherence.

The bearing unit which provides the radial adjustability and which rotatably journals the roller segment by means of one or more anti-friction bearings may be provided in various different embodiments. The anti-friction bearing is preferably a single ball bearing arranged in the middle of the roller segment, but it is also conceivable that several ball bearings or roller bearings are used for each roller segment, especially in the case of a guide roller which is subjected to heavy operating loads. I the latter case, the bearing unit would have to include an appropriate common sleeve on which the several bearings are mounted, the sleeve in turn being operatively connected to the pressure medium in the pressure chamber.

BRIEF DESCRIPTION OF THE DRAWINGS

Further special features and advantages of the invention will become apparent from the description following below, when taken together with the accompanying drawings which illustrate, by way of example, several embodiments of the invention, represented in the various figures as follows:

FIG. 18 shows in a schematic end view the application of a guide roller of the invention as a pressure roller in a paper making machine; and FIG. 19 shows the device of FIG. 18 in plan view.

DESCRIPTION OF THE PREFERRED EMBODIMENTS

Figure 1:
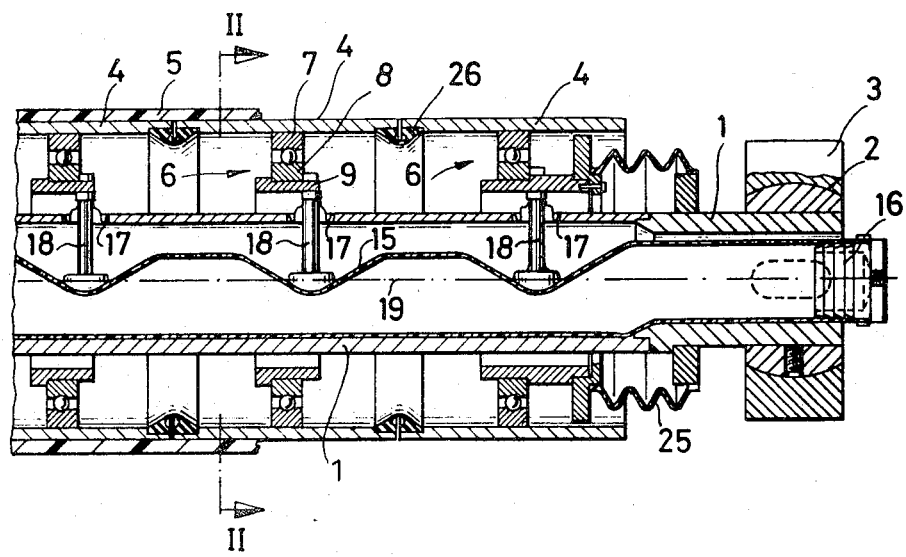
FIG. 1 shows a sectioned longitudinal end portion of a pressure-balanced guide roller with several roller segments arranged for pivoting adjustment motion, in a first embodiment of the invention.
Figure 16:
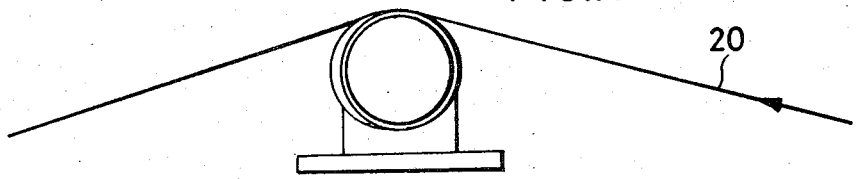
FIG. 16 shows in an elevational view a guide roller embodying the invention which serves as a broad-stretching device.
Figure 17:
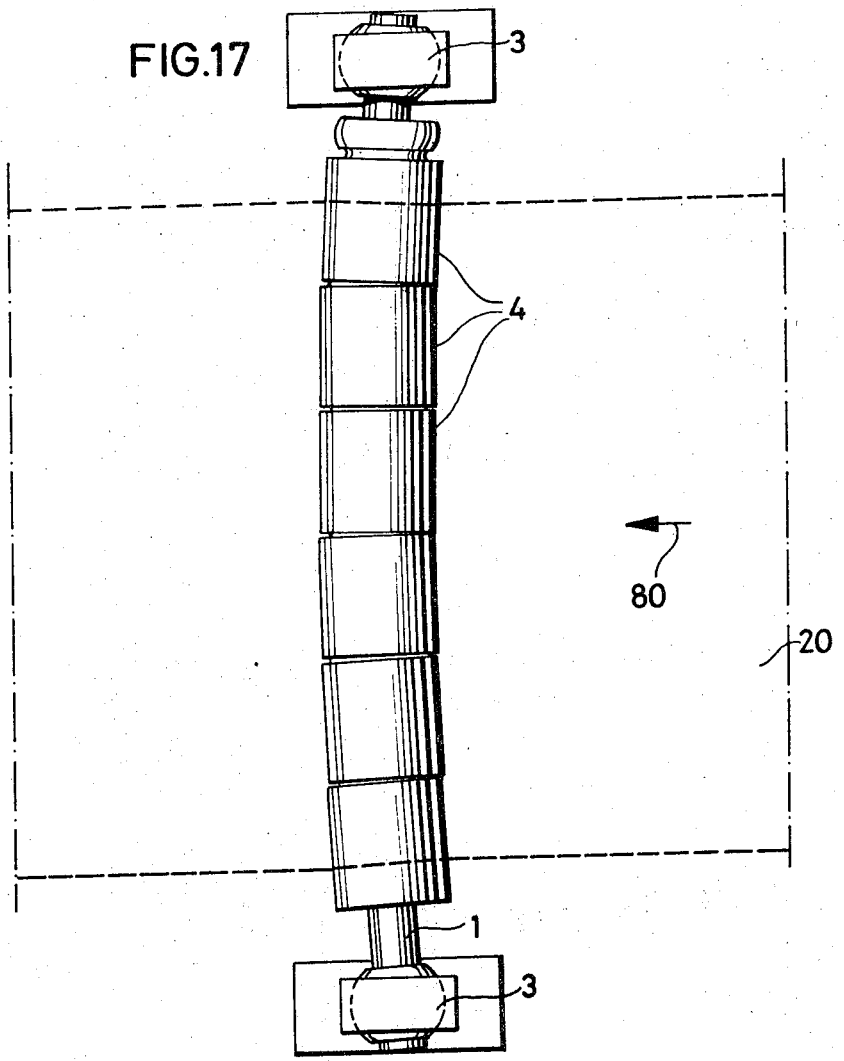
FIG. 17 shows the device of FIG. 16 is a plan view.

In FIG. 1 is illustrated a first embodiment of the invention which shows one end portion of a guide roller being supported by a heavy-walled tubular head traverse 1 which extends through the entire guide roller as a stationary support therefor. Both ends of the stationary head traverse 1 are supported against the machine frame (not shown) by means of a swivel support 3 which includes spherical support surfaces 2 permitting angular adjustment of the roller axis relative to support 3. Thus, the head traverse, when subjected to deflection or when otherwise curved out of its straight-line axis, is allowed to freely adjust for this deflection in the swivel support 3, without causing any additional stress. This feature is particularly important in the case of an intentional curvature of the head traverse axis which is present when the guide roller of the invention is used as a broad-stretching device, as is illustrated in FIGS. 16 and 17 which will be described in more detail below.

The swivel supports 3 also permit a rotational adjustment of the stationary head traverse 1 around ito center axis, in order to permit an alignment of the head traverse relative to the arriving and departing web strands which may be different for different operating conditions. It also serves for the exact orientation of the head traverse in the case of the broad-stretching device, where the orientation of the curvature determines the degree of broad-stretching achieved.

The head traverse 1 supports a plurality of roller segments 4 which are arranged approximately concentrically around the head traverse 1 and which are axially closely adjacent to one another. However, a small gap is maintained between adjacent roller segments 4, in order to permit relative angular shifting of the roller segments during deflection of the head traverse 1, without causing axial contact between adjacent roller segments. When this type of wide web guide roller is used in connection with paper making machinery, the axial gap between adjacent roller segments should be kept very small, i.e. at less than 1 mm, so as to avoid the creation of folds and other defects on the paper web.

The roller segments 4 may be fabricated of steel, aluminum, plastic, or any other suitable material. It is also possible to provide on the periphery of the roller segments a common continuous sleeve 5 of a resilient material which provides a continuous contact surface without diminishing the adjustability of the individual roller segments (FIG. 1).

Each roller segment 4 is individually supported by a bearing unit 6 which includes an anti-friction bearing, illustrated in FIG. 1 as a ball bearing having an outer race 7 and an inner race 8. The roller segment 4, consisting of a length of tubing, is directly supported on the outer bearing race 7, the inner race 8 being mounted on a sleeve 9 which is non-rotatable, but radially adjustable, as will be described below.

It should be understood that the single ball bearing 7, 8, as illustrated, could also be replaced by multiple ball bearings in parallel arrangement, by roller bearings, or by still other types of bearings, depending upon the design requirements for the specific operating conditions.

Figure 2:
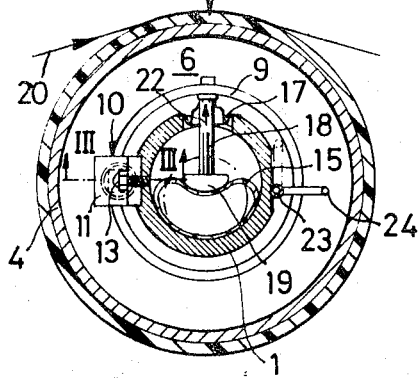
FIG. 2 shows a transverse cross section taken along line II—II of FIG. 1.
Figure 3:
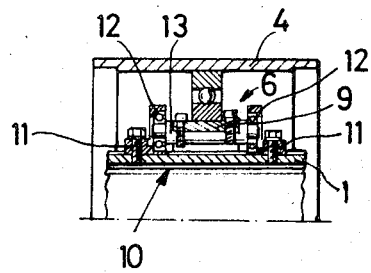
FIG. 3 is a partial longitudinal cross section taken along line III—III of FIG. 2, showing the pivot arrangement.

Referring to FIGS. 2 and 3, it can be seen that the bearing units 6 which support the roller segments 4 are pivotably connected to the head traverse 1 by means of a pivot joint 10. The pivot joint 10 includes two bearing blocks 11 which are mounted on a lateral face of the head traverse 1 and which support between them a pivot shaft 13 with ball bearings 12. The pivot shaft 13 is fixedly connected to the sleeve 9 of the bearing unit 6.

The inner diameter of sleeve 9 is somewhat larger than the outer diameter of the head traverse 1 so as to permit a certain pivoting adjustment of the sleeve 9 relative to the head traverse 1, the pivot shaft 13 serving as one of two points of support for the bearing unit 6. Since the pivot point is arranged laterally in relation to the center of the head traverse 1, the adjustment motion of the bearing unit 6, though restricted to an arc around the pivot shaft 13, is essentially vertical within the adjustment limits.

In the cavity of the hollow head traverse 1 is arranged a hose-like pressure cushion 15 which is hermetically closed on both ends (end 16 being shown in FIG. 1). The pressure cushion 15 is filled with a pressure medium such as hydraulic oil, for example.

In the upper wall portion of head traverse 1 are arranged vertical passages 17 which accommodate headed stems 18. These stems 18 are fixedly attached to the sleeves 9 of the bearing units 6 and rest with their rounded lower end portion against the upper surface of the pressure cushion 15, thus providing a second support point for the bearing units 6 (see FIGS. 1 and 2). The axis of the headed stems 18 is vertical, i.e. approximately perpendicular to the plane which is defined by the axes of the pivot shaft 13 and of the head traverse 1. A paper web 20 running over the upper portion of the roller segments 4 exerts a contact pressure 21 against the latter, thereby tending to push the roller segment 4 and its bearing unit 6 downwardly against the pressure cushion 15 and thus creating an adjustment moment about pivot shaft 13, since the latter is arranged at a distance from the direction of force 21. The adjustment moment created by the contact force 21 is opposed by a biasing force 22 exerted against the headed stem 18 by the pressure medium inside the flexible pressure cushion 15, as the stem deflects the surface of the pressure cushion. The headed stem 15, and with it the bearing units 6 and roller segment 4, thus seek an equilibrium position in which the adjustment moment resulting from contact force 21 equals the opposing biasing force 22 created by the pressure cushion 15. Each roller segment 4 is thus supported against the pressure cushion 15, and the opposing biasing force exerted by the pressure cushion is identical for each roller segment, since the fluid pressure medium inside the pressure cushion 15 causes an automatic equalization of pressure. Thus, the contact pressure 21 on each individual roller segment 4 must likewise be equal, regardless of the position of the roller segment relative to the head traverse 1 and regardless of the deflection of the latter under the sum total of contact pressures 21. The overall load carrying capacity of the guide roller can be adjusted by simply increasing or decreasing the amount of pressure fluid contained in the flexible pressure cushion 15. This type of pressure-balanced, multiple segment guide roller assembly is particularly well adapted for use as a broad-stretching device, in which case the central axis of the head traverse 1 is deliberately curved so as to set the roller segments positioned at both extremities of the guide roller at an angle to one another, as shown in FIG. 17. In this case the angle of deflection of the paper web 20, as represented by the arriving and departing web strands, is relatively small (FIG. 16). However, it is important that, in spite of the small angle of contact and consequent light contact pressure against the roller segments 4, the latter carry the paper web without slippage. For this reason it is necessary that the roller segments 4 turn with an absolute minimum of rotational friction. To achieve this, the invention suggests a continuous lubrication system which uses an oil mist surrounding the ball bearings of the bearing units 6. The oil is supplied to the inside of the assembly through a longitudinal supply conduit 23 (FIG. 2) to which are connected a plurality of branch lines 24 which emit a jet of atomized oil in the direction of the ball bearings 7, 8.

The oil supply conduit 23 is arranged to be rotatable around its axis so that the branch lines 24 can be pivoted from their radial direction into a tangential direction, as indicated by dotted lines in FIG. 2, thereby facilitating the assembly of the bearing units 6 on the head traverse 1. Following emplacement of the bearing units 6, the main conduit 23 is simply rotated by one-quarter turn so as to reorient the branch lines 24 against the ball bearings. It is of course necessary that the oil mist is retained inside the guide roller assembly, as it might otherwise stain the paper web 20. The guide roller is therefore arranged to form a closed assembly by providing a sealing bellow 25 on each end and by providing flexible peripheral seals 26 between adjacent roller segments 4. The peripheral seals 26 serve the additional purpose of equalizing the rotational motion of adjacent roller segments 4, by transmitting a torque between them. This torque-transmitting feature could also be used as a means to drive the roller segments 4 in the case of a driven pressure-balanced guide roller.

Figure 4:
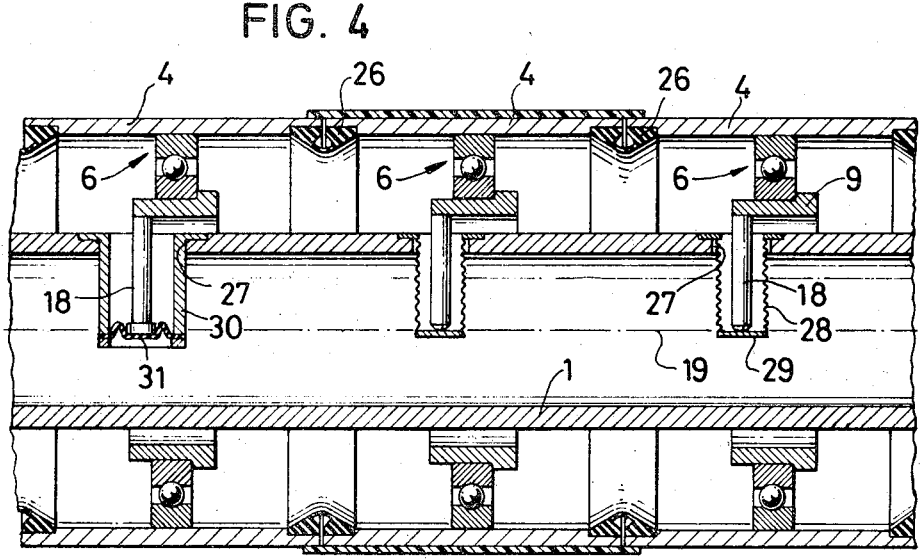
FIG. 4 shows in a longitudinal cross section similar to that of FIG. 1 a second embodiment of the invention.
Figure 5:
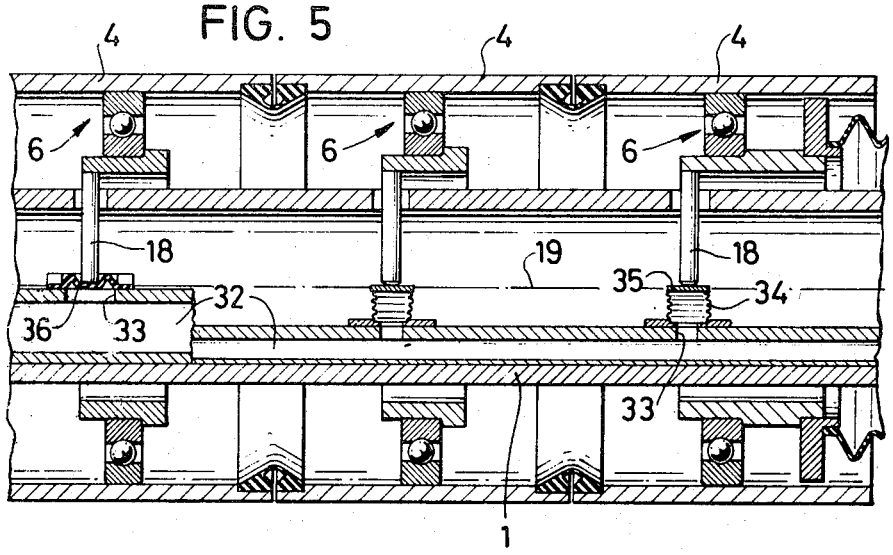
FIG. 5 shows a modified version of the embodiment of FIG. 4.

In FIGS. 4 and 5 are illustrated two somewhat similar embodiments, the roller segments 4 being pivotable in relation to the head traverse 1 in a manner similar to that described with reference to FIGS. 1-3. However, these embodiments do not use a flexible, fluid-filled hose as a pressure cushion. Rather, a pressure chamber with rigid walls is provided inside the head traverse 1, the rigid pressure chamber having openings through which the vertical stems 18 of the bearing units 6 can be exposed to the equalized biasing pressure of the pressure chamber. These openings are covered by elastic members such as membranes or bellows.

In the embodiment of FIG. 1 the entire cavity of the hollow head traverse 1 serves as the pressure chamber. The tubular head traverse is thus entirely filled with pressure medium. In order to accommodate the stems 18, the head traverse has a vertical opening 27 for each stem 18 which is closed by a bellow 28. The purpose of the bellows 18 is to extend the contact area between the lower end of stem 18 and the pressure medium to the vicinity of the axis 19 of the head traverse 1. A bottom plate 29 at the lower end of bellows 28 is thus subjected to the pressure medium on its lower side and carries the stem 18 on its upper side. As in the embodiment described with reference to FIGS. 1–3, the stem 18 is again rigidly connected to the sleeve 9 of the bearing unit 6, which thus provides a pivoting adjustability for each roller segment 4. In the left-hand portion of FIG. 4 is illustrated a somewhat modified version of this embodiment, a rigid housing 30 replacing the bellows 28. In this case the lower end of stem 28 engages a flexible end membrane 31 which closes off the lower end of housing 30. This version is capable of sustaining higher pressures inside the pressure chamber than the bellows version, especially if the membrane 31 is a roll membrane.

The embodiment illustrated in FIG. 5 is similar to that shown in FIG. 4, with the exception that in this case the rigid pressure chamber is reduced to a pressure channel 32 whose vertical openings again provide the pressure contact for the lower ends of the stems 18. In the right-hand portion of FIG. 5 the pressure channel 32 is arranged below the center axis 19 of head traverse 1 so that the bellows 34 with end places 35 are again necessary to bring the contact area near the main axis 19. Of course, the bellows 34 could again be replaced by a rigid housings similar to the housing 30 of FIG. 4.

In the left-hand portion of FIG. 5 the upper wall of the pressure channel 32 coincides approximately with the center axis 19 of the head travers 1, so that only a membrane 36 covering the vertical opening 33 is necessary to provide the contact area for stem 18. The membrane 36 is again preferably a roll membrane. In each case the stem 18 adjusts the vertical position of the bearing units 6 and roller segment 4 until an equilibrium is reached between the downward force exerted on the outside of roller segment 4 and the upward biasing force exerted against the end plate or membrane, respectively, by the pressure medium.

As already mentioned, the contact area between the stem 18 and the pressure medium is preferably in the vicinity of the center axis 19 of head traverse 1, as illustrated in FIGS. 1–5. The contact area thus coincides approximately with the tangent point of the axis of stem 18 on the arc of adjustment motion around pivot axis 13 so that lateral motion of stem 18 in the contact area is effectivey minimized. Thus, the stem 18 executes essentially a vertical motion against the pressure cushion 15 (FIG. 2), or against the bottom plates 29 and 35, or roll membranes 31 and 36 (FIGS. 4 and 5), respectively. This arrangement minimizes wear and thus improves the ease of operation of the roller assembly.

Figure 6:
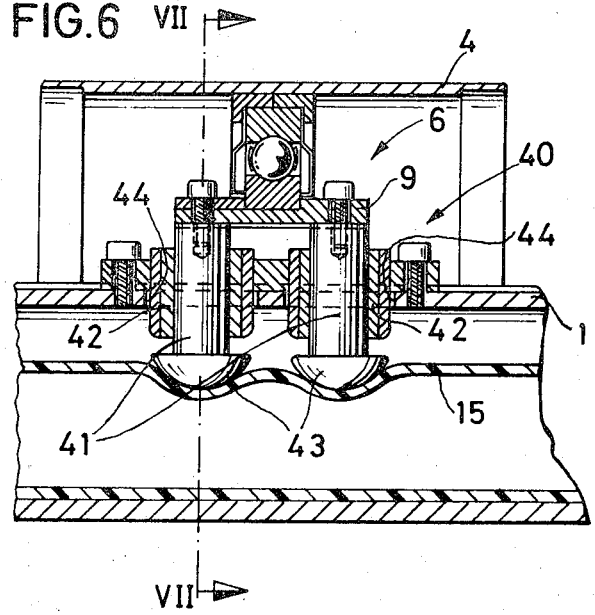
FIG. 6 shows in a partial longitudinal cross section still another embodiment of the invention, where the adjustment guide is of the straight-line type.
Figure 7:
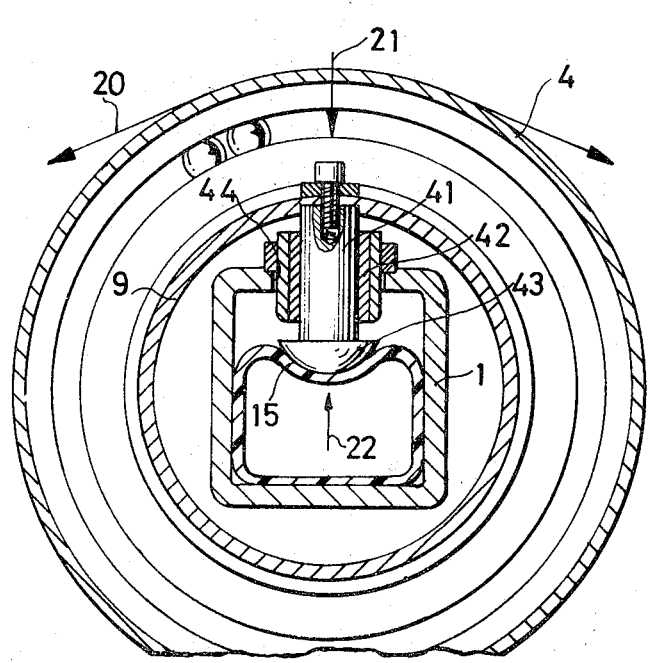
FIG. 7 shows a transverse cross section taken along line VII—VII of FIG. 6.

In FIGS. 6 and 7 is shown an embodiment in which the adjustment motion is not a pivoting motion along an arc, but is confined to a straight-line motion path, the bearing units 6 and the roller segments 4 being adjustable through purely radial displacements of the adjustment mechanism.

The straight-line guide 40 shown in FIG. 6 includes two radially oriented, parallel guide plungers 41 for each bearing unit, the plungers being axially spaced on opposite sides of the bearing unit 6 and fixedly attached to its sleeve 9. The plungers 41 are guided inside two stationary guide sleeves 42 which are mounted on the upper side of the head traverse 1 so that they reach into the cavity of the head traverse through appropriate openings 44 in the wall of the latter. The plungers 41 are comparable to the headed stems 18 of FIG. 1 in that they have similar rounded head portions 43 with which they bear against the upper wall of a flexible pressure cushion 15. The pressure cushion 15 is comparable in every respect to the pressure cushion 15 of FIGS. 1–3. However, the head traverse 1 is preferably of square-tubular cross section, in order to facilitate the mounting of the guide sleeves 42 on its upper horizontal wall.

The axes of the plungers 41 are preferably in exact alignment with the direction of the contact force 21 on the roller segments so that the friction between the plungers 41 and the bushings 42 is minimized. As in the previous described embodiment, the downwardly oriented contact force 21 is again opposed by an upwardly directed equalized biasing force 22 created by the pressure medium inside pressure cushion 15.

Figure 8:
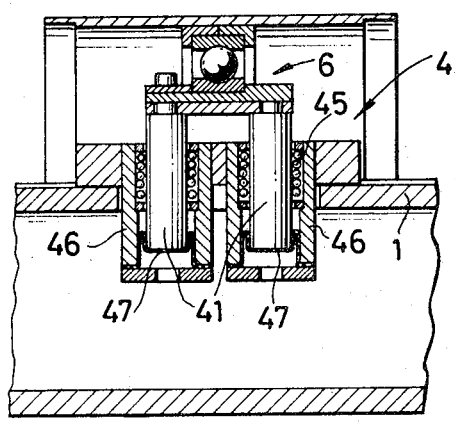
FIGS. 8 and 9 show modified versions of the embodiment of FIG. 6.
Figure 9:
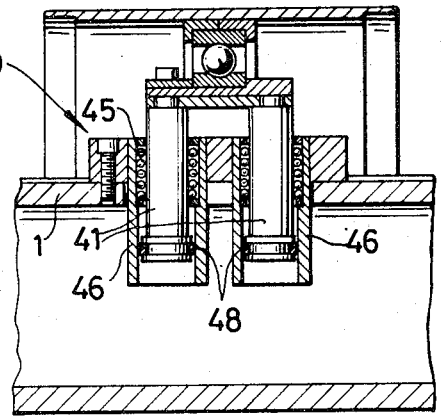

In FIGS. 8 and 9 are shown additional embodiments, where the straight-line adjustment mobility of the bearing units 6 is provided in combination with a rigid pressure chamber inside the head traverse 1. In this case the two plungers 41 are again guided for vertical motion relative to the head traverse 1, but the lower ends of the plungers 41 cooperate with rigid housings 46 in the manner of a piston and cylinder. The shaft of each plunger 41 is preferably longitudinally guided by means of a ball bushing 45, thereby minimizing frictional resistance. The only difference between the versions of FIG. 8 and FIG. 9 is that the piston action in FIG. 8 is provided by a roll membrane 47, whereas in FIG. 9 the lower end of plunger 41 itself is provided in the form of a piston head. In each case the diameter of the end portion of the plunger 41 determines the force with which the pressure medium pushes the plunger and the bearing unit 6 upwardly against the outside contact pressure acting on the roller segment 4. The piston head of the plungers 41 illustrated in FIG. 9 may be provided with a circular groove to accommodate an O-ring 48 for sealing purposes. In each case the guide members 46 are rigidly and sealingly clamped against the upper wall of the head traverse 1, and the entire cavity of the head traverse is filled with a pressure medium.

Figure 10:
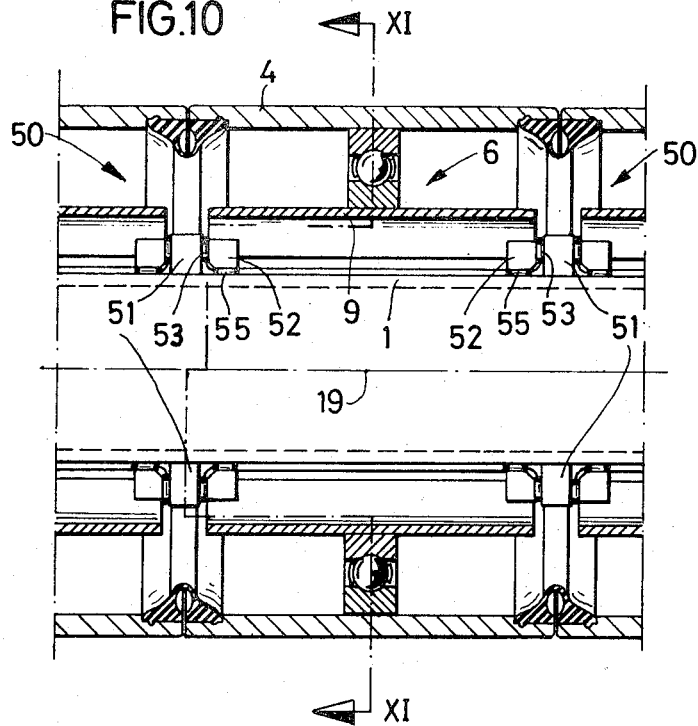
FIG. 10 shows in a longitudinal cross section still another embodiment of the invention where the adjustable roller segment is guided for straight-line motion.
Figure 11:
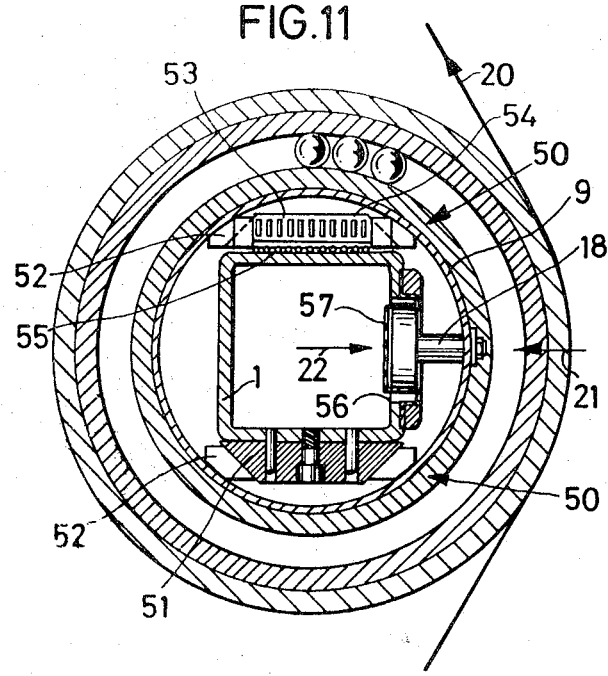
FIG. 11 shows in a tranverse cross section taken along line XI—XI of FIG. 10 details of the straight-line guide of FIG. 10.

Still another embodiment featuring a straight-line adjustment motion is illustrated in FIGS. 10 and 11, the straight-line guides being designated by the assembly numeral 50. However, in this case the guides are not provided in mid-length of each roller segment, but between adjacent roller segments so that each bearing unit 6 is guided on both axial ends thereof. Thus, the sleeve 9 of the bearing unit 6 extends over substantially the entire length of each roller segment to cooperate with a stationary guide rail 51 arranged between adjacent roller segments. Each guide rail 51 therefore positions the axial ends of two adjacent sleeves 9, the latter carrying cooperating guide profiles 52 through anti-friction straight-line needle bearings 53. In FIG. 11 are shown the needle cages 54 by which the needles 53 are positioned between the stationary guide rails 51 and the moving guide profiles 51.

An additional straight line guide surface is provided on the upper and lower face of the square head traverse 1 using again a set of anti-friction needles 55, the latter being arranged between the inner faces of the guide profiles 52 and the aforementioned outer faces of the head traverse 1. Thus, each bearing unit 6 and roller segment 4 is firmly guided for straight-line adjustment displacements in the direction of the opposing force 21 and 22 (FIG. 11), the guide arrangement exerting a minimum of frictional resistance against this adjustment motion.

The wall of the head traverse 1 which faces against the contact force 21 is again provided with openings 56 through which the stems 18 are subjected to the pressure medium inside the head traverse 1. Since in this case the stem 18 does not provide any guide function, only a simple roll membrane 56 is necessary to close the pressure chamber against the headed stem 18. The stem 18 and the bearing units 6 again assume an adjustment position in relation to the web 20 which corresponds to an equilibrium condition between the sum of the biasing forces 22 resulting from the pressure medium inside the head traverse 1 and the contact force 21 resulting from the tension of the web 20.

Figure 12:
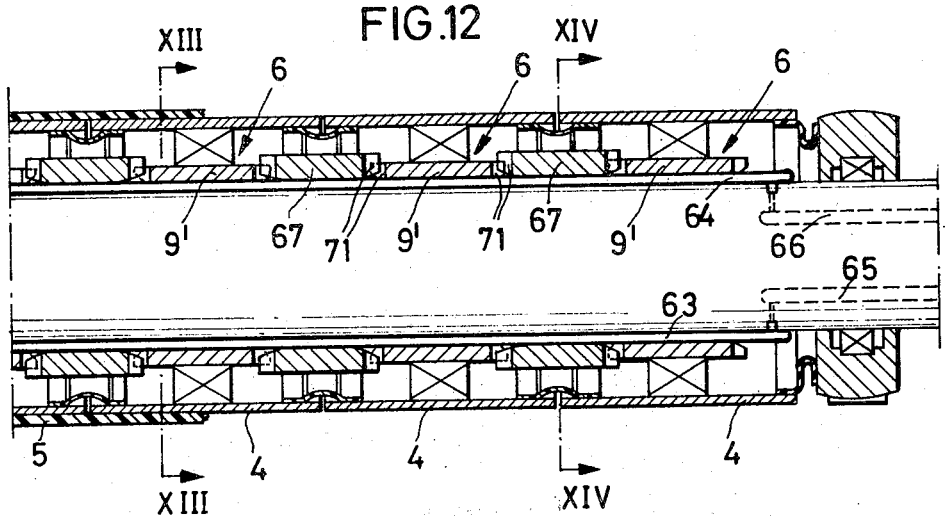
FIG. 12 shows in a partial longitudinal cross section still another embodiment of the invention in which the adjustability of the roller segments is limited by guide collars.
Figure 13:
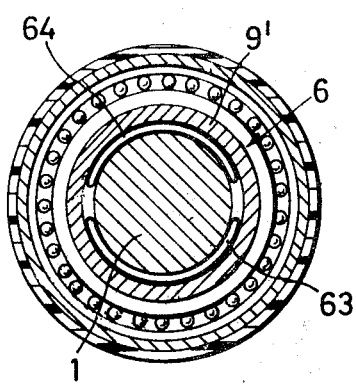
FIG. 13 is a transverse cross section taken along line XIII—XIII of FIG. 12.
Figure 14:
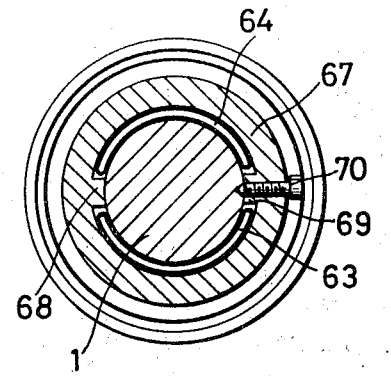
FIG. 14 is a transverse cross section taken along line XIV—XIV of FIG. 12.

FIGS. 12 to 14 show still another embodiment of the invention. Here, the head traverse 1 is shown as a solid, full body 1, though it could be hollow, if desired. The balancing pressure is again provided by means of a flexible pressure cushion, however, in this case in the form of two thin, arcuate pressure cushions 63 and 64 arranged on opposite sides outside the stationary cylindrical head traverse 1. The arcuate pressure cushions 63 and 64 extend over the entire length of the guide roller and occupy only a shallow annular gap between the cylindrical periphery of the head traverse 1 and the somewhat larger bore of the sleeve 9' which carries the bearing units 6. The pressure cushions 63 and 64 are again closed bodies of flexible material, the ends of the pressure cushions being connected to supply bores 65 and 66 in the end portions of the head traverse 1 (FIG. 12). The fact that in this embodiment the pressure cushions 63 and 64 are provided on the outside of the head traverse 1 makes it possible to directly support the sleeves 9' against the pressure cushions, thereby eliminating the stems 18 of the previously described embodiments. An additional advantage of this arrangement resides in the fact that a large contact surface is provided between the sleeves 9' of the bearing units 6 and the outer face of the pressure cushions so that the bearing units 6 remain correctly positioned in the radial plane, thereby essentially eliminating one degree of freedom which previously required separate guide means for its elimination. Where it is necessary for proper operation of the device, this embodiment thus permits adjustment of the bearing units 6 in different radial directions, without having the disadvantages of alignment distortion and vibration of the prior art, and without requiring the costly guide means of the previously described embodiments.

The sleeves 9' of this embodiment are considerably shorter than the roller segments 4, and between adjacent sleeves are arranged stationary guide collars 67 which determine the axial position of the sleeves 9' and also delimit their radial adjustability. In order to accommodate the continuous profile of the arcuate cushions 63 and 64, these guide collars 67 have appropriate arcuate recesses between two oppositely arranged hub portions 68 and 69 by which they are centered on the outside of the head traverse 1. These hub portions 68 and 69 are positioned in the angular intervals between the ends of the arcuate pressure cushions 63 and 64, the latter covering an angle of less than 180° of the head traverse circumference. Each guide collar 67 is angularly positioned and fixedly retained in relation to the head traverse 1 by means of a set screw 70 which engages a positioning groove in the head traverse. The sleeves 9' thus alternate with fixed guide collars 61 along the length of the head traverse 1, each sleeve 9' and each guide collar 67 having a set of axially extending teeth 71 by which the axial mobility of the sleeve 9' and of the bearing units 6 is limited. The bearing unit 6 is thereby simultaneously positioned in the axial direction and its sleeve 9' is prevented from rotating on the arcuate pressure cushions 63 and 64 which support it. The equilibrium position of the sleeve 9' is determined exclusively by the balance between the outside contact pressure from the web and the inner biasing pressure of the pressure cushion, the axial teeth 71 of the sleeves 9' and of the collars 67 serving merely to delimit the radial displaceability of the roller segments 4 and to prevent rotation of the sleeves 9'. There is therefore practically no waer on these axial teeth 71, and the radial adjustment of the bearing units 6 occurs with a minimum of resistance.

The fact that the pressure cushions 63 and 64 are arcuate and cover a major portion of the circumference of the head traverse 1 has the great advantage that the balancing effect of the pressure cushions operates over a wide angular range.

A special situation exists in the case where the web 20 is smaller than the overall width of the guide roller assembly, so that one or more roller segments at the extremities of the guide roller assembly remain free of web pressure. This can lead to a situation of extreme adjustment displacement on these end roller segments 4, because no counter-balancing force exists against the biasing pressure exerted by the pressure cushion 15 against the headed stem 18. Such an extreme adjustment position may be undesirable, especially in the case where peripheral seals 26 are provided between adjacent roller segments 4, so that an appropriate compensation is necessary.

Figure 15:
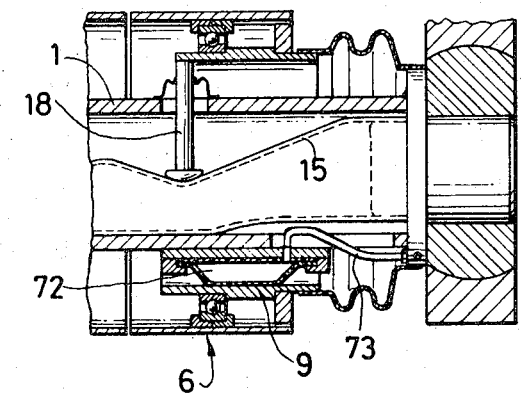
FIG. 15 shows in a partial longitudinal cross section an end portion of a guide roller of the invention which includes pressure compensating means.

Such a compensating device is suggested in the embodiment of FIG. 15 where a compensation chamber 72 is provided in the bottom portion of the bearing unit 6. This compensation chamber 72 is filled with a pressure medium which is supplied through a line 73 independently of the pressure present inside pressure cushion 15. A simple adjustment of the volume of pressure medium inside the compensation pressure chamber 72 permits alignment of the adjustment position of the end roller segment 4 with the adjacent roller segment. It is of course possible to provide this kind of pressure compensation for several roller segments on each extremity of the guide roller assembly.

In FIGS. 16 and 17 is illustrated a pressure balanced guide roller assembly whose center axis is deliberately curved so as to serve as a broad-stretching roller for a paper web. In this case the curvature of the head traverse 1 is such that the end roller segments 4 are oriented obliquely away from the web 20 so that the latter is stretched through the contact with the roller segments 4 which provide a laterally directed motion component in addition in the longitudinal web motion along arrow 80. The amount of broad-stretching achieved depends upon the angle of contact between the arriving and departing web strands (FIG. 17), the contact pressure between the web and the periphery of the roller segment within the angle of contact (FIG. 16) causing the web to follow a path within a radial plane perpendicular to the inclined roller axis, thereby causing a particular point on the paper web 20 to move away from the web center by a distance which is determined by the difference in lateral distance between the point of its arrival on the roller segment and the point of its departure from the roller segment. This broad-stretching effect is illustrated by the dotted lines in FIG. 17 which represent the edges of a continuously moving paper web 20.

A particularly advantageous feature of this last-mentioned embodiment, when used as a broad-stretching roller, is the fact that its stretching effect is evenly distributed over the entire width of the web 20, and that it has a desirable flattening effect on the latter by eliminating and preventing folds and wrinkles in the paper web. This effect is of considerable importance for high speed paper processing machinery where it is essential that uniform webs of paper products are obtained.

The maximum differences in equilibrium position between adjacent roller segments 4 under normal operating conditions are comparatively small, at most approximately 1 mm. However, when considering the entire length of the guide roller, total adjustment differences of between 6 and 8 mm may result from differences in web tension and roller deflection.

A preferred embodiment of guide roller for use as a broad-stretching roller in accordance with FIGS. 16 and 17 is the one shown in FIG. 1, without the sleeve 5 on its periphery. In this case the adjacent roller segments 4 are arranged very close to one another, leaving an axial gap between 0.1 and 0.5 mm, so that the paper web cannot be caught between the roller segments.

In FIGS. 18 and 19 is illustrated still another use of the guide roller of the invention, where it serves as a pressure roller in conjunction with a double-roller winding unit. In this device the paper web 20 is rolled onto a roll 81 which is supported and driven by the two supporting rollers 82 and 83. The pressure roller applies balanced downward pressure against the roll 81. The fact that the pressure roller applies an evenly distributed pressure against roll 81 over its entire length thus assures that the paper roll 81 is produced without wrinkles or folds as a smooth solid cylindrical roll. An embodiment suitable for this application would be that shown in FIG. 1, left-hand side, i.e., with the roller segments 4 covered by a resilient sleeve 5.

It should be understood, of course, that the foregoing disclosure describes only preferred embodiments of the invention and that it is intended to cover all changes and modifications of these examples of the invention which fall within the scope of the appended claims.

What is claimed is:

1. A pressure-balanced guide roller assembly adapted for the conveyance of wide webs, comprising in combination:
   a non-rotating, substantially rigid head traverse extending centrally through the entire length of the roller assembly and connected to a frame-support on each end thereof;
   a plurality of roller segments arranged axially adjacent to one another on the head traverse so as to form an outwardly substantially continuous, generally cylindrical roller assembly for contact with a running web or the like;
   an independent bearing unit rotatably supporting each roller segment, each bearing unit including a non-rotating sleeve surrounding the head traverse;
   means for adjustably positioning each bearing unit relative to the head traverse, including means for radially biasing each bearing unit and its roller segment in opposition to the contact pressure exerted by the web against the roller assembly; and
   means for restraining the adjustment displacements of each bearing unit to motions of the bearing unit center along only a single displacement path within a radial plane.

2. A guide roller assembly as defined in claim 1, wherein:
   the adjustment restraining means includes a pivot connection between each bearing unit and the sleeve of the head traverse, the axis of the pivot connection being parallel to the rotational axis of the roller segment and radially spaced with respect thereto in a plane which is substantially at right angles to the direction of contact pressure on the roller assembly; and
   the biasing means exerts a pivoting moment on the bearing unit about its pivot connection which is opposed to the pivoting moment resulting from the contact pressure.

3. A guide roller assembly as defined in claim 2, wherein:
   the pivot connections are arranged on a longitudinal outside face of the head traverse and include for each bearing unit a pivot pin attached to the sleeve of the bearing unit and a pivot block attached to the head traverse.

4. A guide roller assembly as defined in claim 1, wherein:
   the adjustment restraining means includes a straight-line guide connection between each bearing unit and the head traverse for reciprocating adjustment motions of the bearing units, the orientation of the straight-line motion path being substantially in alignment with the direction of contact pressure on the roller assembly; and
   the force exerted on each bearing unit by its biasing means is substantially in opposite alignment with said straight-line motion path.

5. A guide roller assembly as defined in claim 4, wherein:
   the straight-line guide connections include parallel straight-line guide rails on the head traverse and cooperating guide members on the bearing units which are laterally oppositely spaced in relation to the bearing unit axis, the straight-line guide rails being arranged on the outside of the head traverse; and
   the biasing means is arranged between said straight-line guide connections, in general alignment with the straight-line motion path of the bearing unit axis.

6. A guide roller assembly as defined in claim 4, wherein:
   the straight-line guide connections include radially inwardly oriented paralled guide plungers which are fixedly attached to the bearing unit sleeves and matching guide sleeves which are solidary with the head traverse, the guide plungers engaging the guide sleeves for reciprocating radial adjustment motion.

7. A guide roller assembly as defined in claim 6, wherein:

the biasing means directly engages the inner ends of the guide plungers.

8. A guide roller assembly as defined in claim 1, wherein:

the biasing means includes a separate, independent bias-producing member for each bearing unit.

9. A guide roller assembly as defined in claim 1, wherein:

the biasing means includes means fo equalizing the biasing forces acting on all the bearing units regardless of their adjustment positions in relation to the head traverse.

10. A guide roller assembly as defined in claim 9, wherein:

the biasing means includes a pressurized fluid pressure medium to whose pressure the bearing units are separately exposed in such a way as to create identical biasing forces on all bearing units.

11. A guide roller assembly as defined in claim 9, wherein:

the biasing means further includes a fluid-filled pressure chamber having flexible wall portions; and the bearing units engage the flexible wall portions of the pressure chamber on contact surfaces of substantially equal effective area.

12. A guide roller assembly as defined in claim 11, wherein:

the adjustment restraining means includes a pivot connection between each bearing unit and the sleeve of the head traverse, the axis of the pivot connection being parallel to the rotational axis of the roller segment and radially spaced with respect thereto in a plane which is substantially at right angles to the direction of contact pressure on the roller assembly;

the head traverse is a hollow, tubular member;

the pressure chamber of the biasing means is accommodated inside the head traverse; and the bearing units include stems mounted on their sleeves which extend radially toward the inside of the head traverse and against exposed flexible wall portions of the pressure chamber, the effective contact surface defined between each stem and its associated flexible wall portion being located at such a distance and angle in relation to the axis of the associated pivot connection that the plane which is defined by the pivot axis and by the midpoint of the contact surface is substantially perpendicular to the adjustment motion path of the stem at the contact surface.

13. A guide roller assembly as defined in claim 12, wherein:

the pressure chamber is a hose-like flexible pressure cushion which is confined over a major portion of its outer surface within the cavity of the head traverse; and each bearing unit stem includes a rounded head at its inner end with which it engages a wall portion of the pressure cushion, the rounded head defining the effective contact area.

14. A guide roller assembly as defined in claim 12, wherein:

the pressure chamber is constituted primarily of rigid walls, the wall portions in the vicinity of each bearing unit stem being flexible to ensure transmission of the biasing force at the effective contact area and to allow for adjustment displacements of the stem relative to the pressure chamber.

15. A guide roller assembly as defined in claim 14, wherein:

the flexible wall portion in the vicinity of the bearing unit stem is a membrane covering an opening in a rigid wall of the pressure chamber, one side of the membrane being in contact with the pressure medium, the other side bearing against the stem, and the wall opening defining the size of the effective contact area.

16. A guide roller assembly as defined in claim 14, wherein:

the flexible wall in the vicinity of the bearing unit stem is a bellows sealingly attached to an opening in a rigid wall of the pressure chamber, the bottom of the bellows bearing against the stem, and the wall opening defining the size of the effective contact area.

17. A guide roller assembly as defined in claim 4, wherein:

the head traverse is a hollow tubular member; and the biasing means includes a pressurized fluid pressure medium to whose pressure the bearing units are separately exposed in such a way as to create identical biasing forces on all the bearing units.

18. A guide roller assembly as defined in claim 17, wherein:

the straight-line guide connections include radially inwardly oriented parallel guide plungers which are fixedly attached to the sleeves of the bearing units and matching guide sleeves which are solidary with the head traverse, the guide plungers engaging the guide sleeves for reciprocating radial adjustment motion;

the biasing means further includes a piston surface on each guide plunger and a cylinder space inside each guide sleeve, the piston surface and cylinder space cooperating in such a way that, when pressurized, they create a biasing force on the bearing unit which is in opposition to the contact pressure on the roller assembly; and the pressurized fluid pressure medium is in simultaneous communication with all cylinder spaces.

19. A guide roller assembly as defined in claim 17, wherein:

the biasing means further includes a fluid-filled pressure chamber arranged inside the head traverse and having flexible wall portions; and the bearing units include stems mounted on their sleeves which extend radially toward the inside of the head traverse and against exposed flexible wall portions of the pressure chamber, the effective contact surfaces between the stems and the flexible wall portions being substantially identical for each bearing unit.

20. A guide roller assembly as defined in claim 19, wherein:

the pressure chamber is a hose-like flexible pressure cushion which is confined over a major portion of its outer surface within the cavity of the head traverse;

the straight-line guide connections include guide sleeves which are solidary with the head traverse, the guide sleeves cooperating with the stems of the bearing units to form said straight-line guide connections; and each bearing unit stem further includes a rounded head at its inner end with which it engages a wall portion of the pressure cushion, the rounded head defining the effective contact area.

21. A guide roller assembly as defined in claim 19, wherein:

the head traverse is a square-tubular hollow member;

the pressure chamber is constituted by the cavity of the head traverse itself;

the straight-line guide connections are arranged on the outside of the head traverse, on two opposite walls which are parallel to the adjustment motion path; and the head traverse further includes openings on a third wall in concentric alignment with the stems of the bearing units; each opening being covered by a flexible membrane, one side of the membrane being in contact with the pressure medium and the other side bearing against the stem.

22. A pressure-balanced guide roller assembly adapted for the conveyance of wide webs, comprising in combination:

a non-rotating, substantially rigid head traverse extending centrally through the entire length of the roller assembly and connected to a frame-support on each end thereof;

a plurality of roller segments arranged axially adjacent to one another on the head traverse so as to form an outwardly substantially continuous, generally cylindrical roller assembly for contact with a running web or the like;

an independent bearing unit rotatably supporting each roller segment, each bearing unit including a non-rotating sleeve surrounding the head traverse;

means for adjustably positioning each bearing unit relative to the head traverse, including means for radially biasing each bearing unit and its roller segment in opposition to the contact pressure exerted by the web against the roller assembly; and means for restraining the adjustment displacements of each bearing unit to motions within a radial plane; and wherein:

the head traverse has a generally cylindrical outer surface;

the sleeves of the bearing units have a cylindrical bore forming an annular, longitudinally elongated gap between it and the head traverse;

the bearing unit positioning and biasing means includes at least two independent, oppositely arranged fluid-filled arcuate pressure cushions of flexible material extending through the consecutive longitudinal gaps between the bearing unit sleeves and the head traverse so as to support the bearing units by their sleeves, thr pressure cushions being arranged to leave angular intervals between their longitudinal edges; and the displacement restraining means includes guide collars between the bearing units, the guide collars being fixedly connected to the head traverse and arranged to cooperate with the adjacent sleeves of the bearing units in such a way as to prevent said sleeves from rotating relative to the pressure cushions, while delimiting the adjustment displacements of the bearing units to two degrees of freedom within a radial plane.

23. A guide roller assembly as defined in claim 22, wherein:

the guide collars and the bearing unit sleeves have oppositely facing axially extending guide teeth with which they cooperate to delimit the adjustment displacements of the bearing units.

24. A guide roller assembly as defined in claim 22, wherein:

the displacement restraining means includes means for guiding the bearing unit sleeves in relation to the guide collars so as to limit the adjustment displacements of each bearing unit to a single motion path.

25. A guide roller assembly as defined in claim 22, wherein:

the guide collars are centered on the head traverse in the angular intervals between the arcuate pressure cushions and include arcuate recesses for the accommodation of the latter.

26. A guide roller assembly as defined in claim 1, wherein:

the biasing means includes pressurized fluid pressure medium to whose pressure the bearing units are separately exposed in such a way as to create identical biasing forces on all bearing units;

the assembly further comprising:

means for selectively compensating the biasing forces on those end bearing units whose roller segments are not contacted by the running web.

27. A guide roller assembly as defined in claim 26, wherein:

the compensating means includes a fluid-filled compensation chamber between the bearing unit sleeve and the head traverse at the side opposite the direction of radial outward-bias on the bearing unit, and means for pressurizing said fluid.

28. A guide roller assembly as defined in claim 1, further comprising:

means for continuously lubricating each bearing unit from an outside supply of lubricant, the lubricating means including a supply conduit running along the outside of the head traverse and branch lines leading to the bearing units.

29. A guide roller assembly as defined in claim 28, further comprising:

flexible peripheral seals between the edges of adjacent roller segments, and sealing bellows at both extremities of the roller assembly so as to substantially enclose the entire interior space inside the roller assembly;

the lubricating means including means for supplying pressurized oil to the branch lines, the latter including atomizing nozzles to create a lubricating oil mist inside the roller assembly.

30. A guide roller assembly as defined in claim 1, further comprising:

means for rotatably adjusting the head traverse relative to its frame supports for the purpose of resetting the orientation of the biasing means and of the displacement restraining means in relation to the direction of web pressure on the roller assembly.

31. A pressure-balanced broad-stretching roller assembly for use in the conveyance of wide webs, comprising in combination:

a non-rotating, substantially rigid, gently curving head traverse extending centrally through the entire length of the roller assembly, the curvature of the head traverse being concave in the direction of web advance;

swivelling frame supports on each end of the head traverse;

means for rotably adjusting the head traverse relative to its frame supports for the purpose of aligning the head traverse curvature in relation to the web direction;

a plurality of roller segments arranged axially adjacent to one another on the head traverse so as to form an outwardly substantially continuous, generally cylindrical, but gently curved roller assembly for contact with the running web;

an independent bearing unit rotatably supporting each roller segment, each bearing unit including a non-rotating sleeve surrounding the head traverse;

means for adjustably positioning each bearing unit relative to the curved head traverse, including means for radially biasing each bearing unit and its roller segment in opposition to the contact pressure exerted by the web against the roller assembly; and means for restraining the adjustment displacements of each bearing unit to motions within a radial plane.

32. A guide roller assembly as defined in claim 31, wherein:

the adjustment restraining means includes means for restraining the adjustment displacements of each bearing unit to motions of the bearing unit center along only a single motion path within said radial plane.

* * * * *